US006377923B1

(12) United States Patent
Hershkovits et al.

(10) Patent No.: US 6,377,923 B1
(45) Date of Patent: *Apr. 23, 2002

(54) SPEECH RECOGNITION METHOD AND SYSTEM USING COMPRESSION SPEECH DATA

(75) Inventors: Yehudah Hershkovits, Mobile Post Emek Sorek; Gabriel Ilan, Tel Aviv, both of (IL)

(73) Assignee: Advanced Recognition Technologies Inc., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,406

(22) Filed: Oct. 5, 1999

Related U.S. Application Data

(63) Continuation of application No. 09/002,616, filed on Jan. 8, 1998, now Pat. No. 6,003,004.

(51) Int. Cl.[7] .............................................. G10L 15/02
(52) U.S. Cl. ...................... 704/253; 704/255; 704/219
(58) Field of Search .............................. 704/253, 255, 704/270, 251, 252, 275, 200, 217, 219, 262

(56) References Cited

U.S. PATENT DOCUMENTS

| 3,909,532 A | 9/1975 | Rabiner ..................... 179/1 SC |
| 4,475,189 A | 10/1984 | Herr ............................. 370/62 |
| 4,519,094 A | 5/1985 | Brown et al. .................. 381/43 |
| 4,866,777 A | 9/1989 | Mulla et al. ................... 381/41 |
| 4,908,865 A | 3/1990 | Doddington et al. .......... 381/43 |
| 5,208,897 A | 5/1993 | Hutchins ........................ 395/2 |
| 5,305,422 A | 4/1994 | Junqua ...................... 395/2.62 |
| 5,371,853 A | 12/1994 | Kao et al. .................. 395/2.32 |
| 5,528,725 A | 6/1996 | Hui ............................. 395/245 |
| 5,548,647 A | 8/1996 | Naik et al. ..................... 381/42 |
| 5,704,009 A | 12/1997 | Cline et al. ................. 395/2.84 |
| 6,003,004 A | * 12/1999 | Hershkovits et al. ........ 704/253 |

FOREIGN PATENT DOCUMENTS

| EP | 0 671 721 A2 | 9/1995 | ............. G10L/3/00 |
| EP | 0 6741 721 A2 | 9/1995 | ............. G10L/3/00 |
| WO | WO 95/17746 | 6/1995 | ............. G10L/5/06 |

OTHER PUBLICATIONS

Proceedings., IEEE International Conference on Multimedia Computing and Systems '97. Yapp et al., Speech recognition on MPEG/AUDIO encoded files. pp. 624–625, Jun. 1997.*
Tsao et al.; "An Endpoint Detector For LPC Speech Using Residual Error Look–Ahead For Vector Quantization Applications", IEEE International Conference; Mar. 1984; pp. 1–4, vol 2.
Spanias, A., "Speech Coding: A Tutorial Review", Proceedings of the IEEE, vol. 82, No. 10, Oct. 1994, pp. 1541–1582.
Rabiner, L. et al., "Fundamentals of Speech Recognition", Prentice–Hall, 1993.
"European Digital Cellular Telecommunication System (phase 1); Full–rate Speech Transcoding", I–ETS 300 036, European Telecommuncations Standards Institute, Mar. 1992.

* cited by examiner

*Primary Examiner*—Richemond Dorvil
(74) *Attorney, Agent, or Firm*—Eitan, Pearl, Latzer & Cohen-Zedek (57) ABSTRACT

A vocoder based voice recognizer recognizes a spoken word using linear prediction coding (LPC) based, vocoder data without completely reconstructing the voice data. The recognizer generates at least one energy estimate per frame of the vocoder data and searches for word boundaries in the vocoder data using the associated energy estimates. If a word is found, the LPC word parameters are extracted from the vocoder data associated with the word and recognition features are calculated from the extracted LPC word parameters. Finally, the recognition features are matched with previously stored recognition features of other words, thereby to recognize the spoken word.

36 Claims, 9 Drawing Sheets

SPEECH RECOGNITION METHOD AND SYSTEM USING COMPRESSION SPEECH DATA

RELATIONSHIP TO COPENDING APPLICATIONS

This application is a Continuation of application Ser. No. 09/002,616, filed Jan. 8, 1998, now issued as U.S. Pat. No. 6,003,004 which is incorporated herein by reference in its entirety.

FIELD OF THE INVENTION

The present invention relates to voice recognizers generally and to voice recognizers which use LPC vocoder data as input.

BACKGROUND OF THE INVENTION

Voice recognizers are well known in the art and are used in many applications. For example, voice recognition is used in command and control applications for mobile devices, in computer Dictaphones, in children's toys and in car telephones. In all of these systems, the voice signal is digitized and then parametrized. The parametrized input signal is compared to reference parametrized signals whose utterances are known. The recognized utterance is the utterance associated with the reference signal which best matches the input signal.

Voice recognition systems have found particular use in voice dialing systems where, when a user says the name of the person he wishes to call, the voice recognition system recognizes the name from a previously provided reference list and provides the phone number associated with the recognized name. The telephone then dials the number. The result is that the user is connected to his destination without having to look for the dialed number and/or use his hands to dial the number.

Voice dialing is especially important for car mobile telephones where the user is typically the driver of the car and thus, must continually concentrate on the road. If the driver wants to call someone, it is much safer that the driver speak the name of the person to be called, rather than dialing the number himself.

Figure 1:
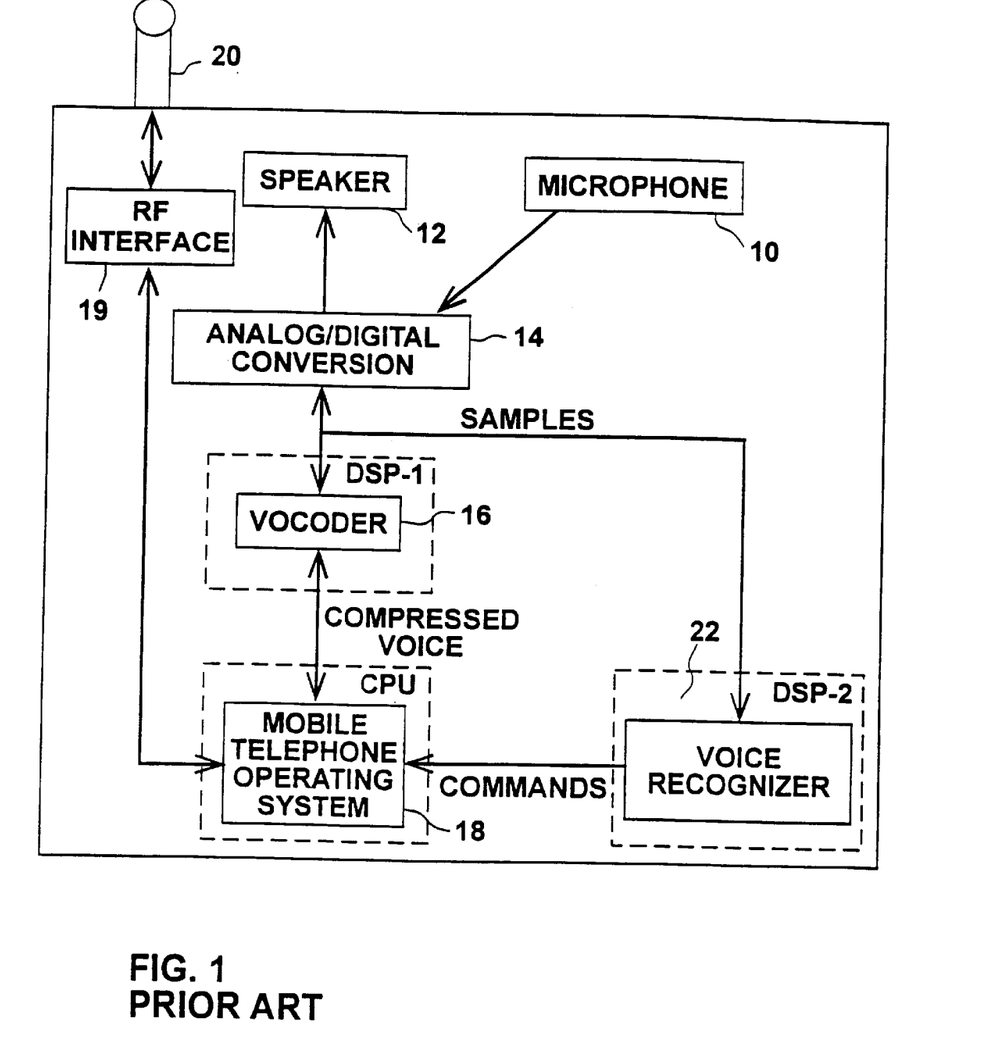
FIG. 1 is a block diagram illustration of a prior art cellular telephone with voice recognition capabilities.

FIG. 1, to which reference is now made, shows the major elements of a digital mobile telephone. Typically, a mobile telephone includes a microphone 10, a speaker 12, a unit 14 which converts between analog and digital signals, a vocoder 16 implemented in a digital signal processing (DSP) chip labeled DSP-1, an operating system 18 implemented in a microcontroller or a central processing unit (CPU), a radio frequency interface unit 19 and an antenna 20. On transmit, the microphone 10 generates analog voice signals which are digitized by unit 14. The vocoder 16 compresses the voice samples to reduce the amount of data to be transmitted, via RF unit 19 and antenna 20, to another mobile telephone. The antenna 20 of the receiving mobile telephone provides the received signal, via RF unit 19, to vocoder 16 which, in turn, decompresses the received signal into voice samples. Unit 14 converts the voice samples to an analog signal which speaker 12 projects. The operating system 18 controls the operation of the mobile telephone.

For voice dialing systems, the mobile telephone additionally includes a voice recognizer 22, implemented in a separate DSP chip labeled DSP-2, which receives the digitized voice samples as input, parametrizes the voice signal and matches the parametrized input signal to reference voice signals. The voice recognizer 22 typically either provides the identification of the matched signal to the operating system 18 or, if a phone number is associated with the matched signal, the recognizer 22 provides the associated phone number.

Figure 2:
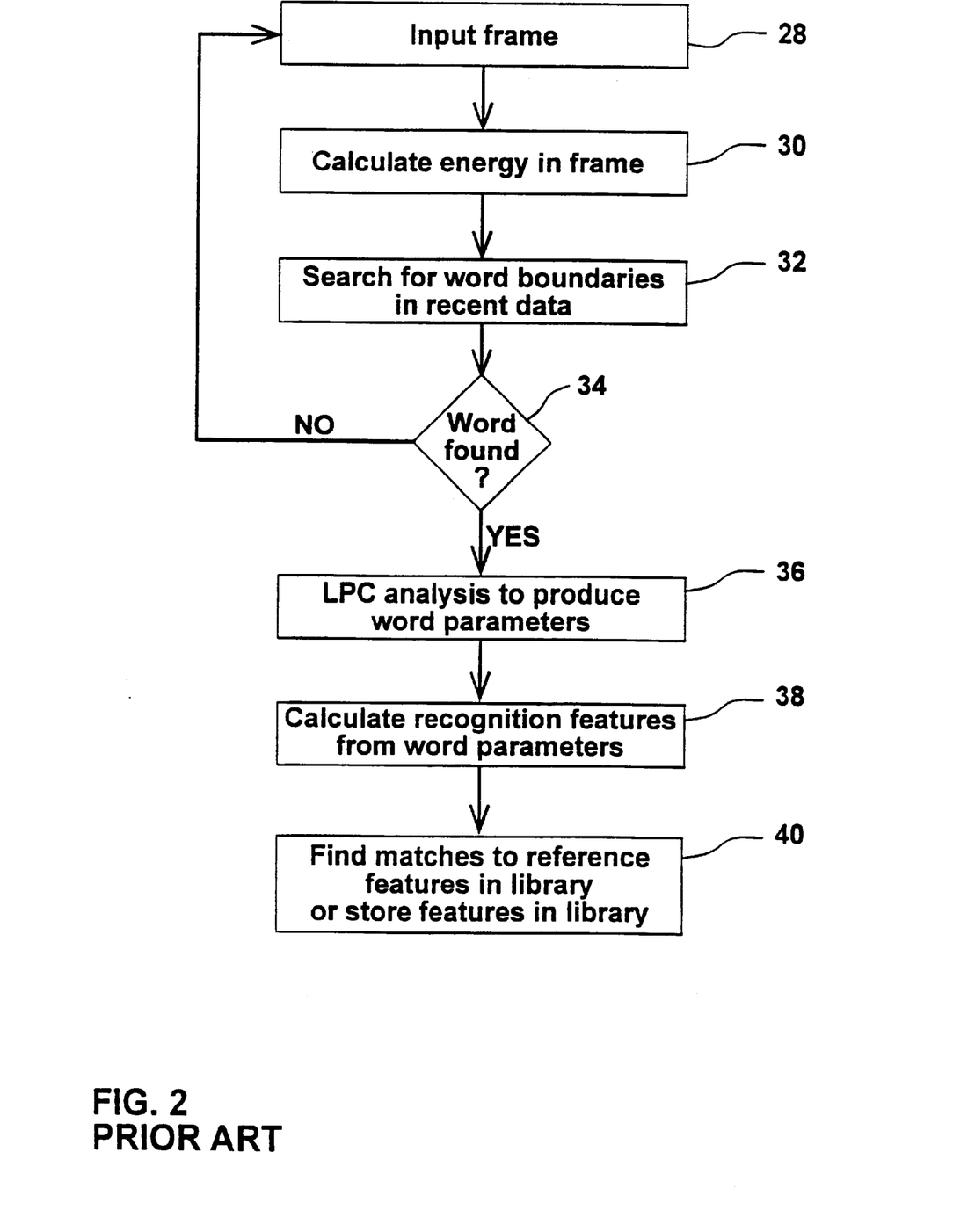
FIG. 2 is a flow chart illustration of a prior art, LPC-based, voice recognition method.

FIG. 2, to which reference is now made, generally illustrates the operation of voice recognizer 22. The digitized voice samples are organized into frames, of a predetermined length such as 5–20 msec, and it is these frames which are provided (step 28) to recognizer 22. For each frame, the recognizer 22 first calculates (step 30) the energy of the frame.

Figure 3:
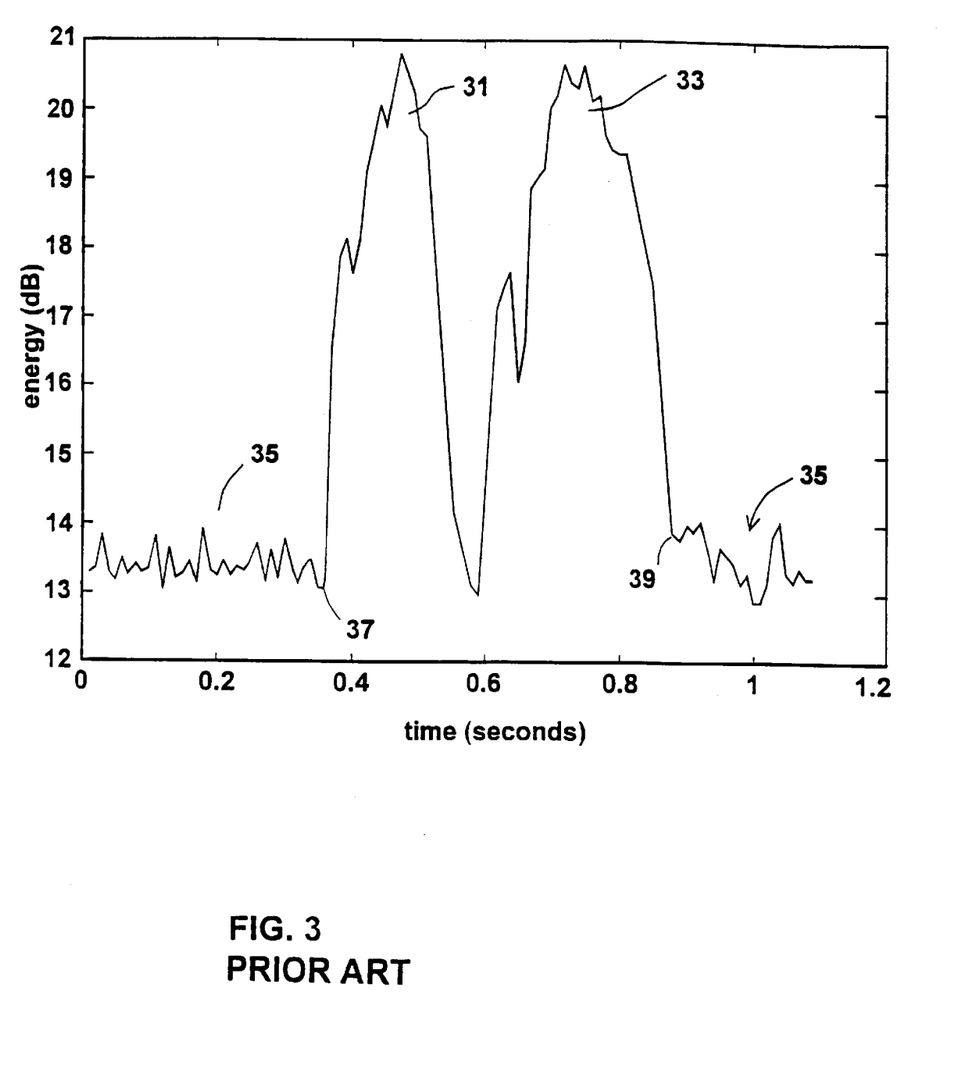
FIG. 3 is a graphical illustration of the energy of a spoken word.

FIG. 3, to which reference is now also made, illustrates the per frame energy for the spoken word "RICHARD", as a function of time. The energy signal has two bumps 31 and 33, corresponding with the two syllables of the word. Where no word is spoken, as indicated by reference numeral 35, and even between syllables, the energy level is significantly lower.

Thus, the recognizer 22 searches (step 32 of FIG. 2) for the start and end of a word within the energy signal. The start of a word is defined as the point 37 where a significant rise in energy begins after the energy signal has been low for more than a predetermined length of time. The end of a word is defined as the point 39 where a significant drop in energy finishes after which the energy signal remains low for more than a predetermined length of time. In FIG. 3, the start point 37 occurs at about 0.37 sec and endpoint 39 occurs at about 0.85 sec.

If a word is found, as checked in step 34, the voice recognizer 22 performs (step 36) a linear prediction coding (LPC) analysis to produce parameters of the spoken word. In step 38, the voice recognizer 22 calculates recognition features of the spoken word and, in step 40, the voice recognizer 22 searches for a match from among recognition features of reference words in a reference library. Alternatively, the voice recognizer 22 stores the recognition features in the reference library, in a process known as "training".

Unfortunately, the voice recognition process is computationally intensive and, thus, must be implemented in the second DSP chip, DSP-2. This adds significant cost to the mobile telephone.

SUMMARY OF THE INVENTION

An object of the present invention is to provide a voice recognizer which operates with compressed voice data, compressed by LPC-based, vocoders, rather than with sampled voice data thereby to reduce the amount of computation which the recognizer must perform. Accordingly, the voice recognition can be implemented in the microcontroller or CPU which also implements the operating system. Since the voice recognizer does not analyze the voice signal, the microcontroller or CPU can be a of limited processing power and/or one which does not receive the voice signal.

Moreover, the present invention provides a feature generator which can extract the same type of feature data, for use in recognition, from different types of LPC based vocoders. Thus, the present invention performs the same recognition (e.g. matching and training) operations on compressed voice data which is compressed by different types of LPC based vocoders.

There is therefore provided, in accordance with a preferred embodiment of the present invention, a method for recognizing a spoken word using linear prediction coding (LPC) based, vocoder data without completely reconstructing the voice data. The vocoder based recognizer implements the method described herein. The method includes the steps of generating at least one energy estimate per frame of the vocoder data and searching for word boundaries in the vocoder data using the associated energy estimates. If a word is found, the LPC word parameters are extracted from the vocoder data associated with the word and recognition features are calculated from the extracted LPC word parameters. Finally, the recognition features are matched with previously stored recognition features of other words, thereby to recognize the spoken word.

Additionally, in accordance with a preferred embodiment of the present invention, the energy is estimated from residual data found in the vocoder data. This estimation can be performed in many ways. In one embodiment, the residual data is reconstructed from the vocoder data and the estimate is formed from the norm of the residual data. In another embodiment, a pitch-gain value is extracted from the vocoder data and this value is used as the energy estimate. In a further embodiment, the pitch-gain values, lag values and remnant data are extracted from the vocoder data. A remnant signal is generated from the remnant data and from that, a remnant energy estimate is produced. A non-remnant energy estimate is produced from a non-remnant portion of the residual by using the pitch-gain value and a previous energy estimate defined by the lag value. Finally, the two energy estimates, remnant and non-remnant, are combined.

Moreover, in accordance with a preferred embodiment of the present invention, the vocoder data can be from any of the following vocoders: Regular Pulse Excitation-Long Term Prediction (RPE-LTP) full and half rate, Qualcomm Code Excited Linear Prediction (QCELP) 8 and 13 Kbps, Enhanced Variable Rate Code (EVRC), Low Delay Code Excited Linear Prediction (LD CELP), Vector Sum Excited Linear Prediction (VSELP), Conjugate Structure Algebraic Code Excited Linear Prediction (CS ACELP), Enhanced Full Rate Vocoder and LPC 10.

There is also provided, in accordance with a further preferred embodiment of the present invention, a digital cellular telephone which includes a mobile telephone operating system, an LPC based vocoder and a vocoder based voice recognizer. The recognizer includes a front end processor which processes the vocoder data to determine when a word was spoken and to generate recognition features of the spoken word and recognizer which at least recognizes the spoken word as one of a set of reference words.

Further, in accordance with a preferred embodiment of the present invention, the front end processor includes an energy estimator, an LPC parameter extractor and a recognition feature generator. The energy estimator uses residual information forming part of the vocoder data to estimate the energy of a voice signal. The LPC parameter extractor extracts the LPC parameters of the vocoder data. The recognition feature generator generates the recognition features from the LPC parameters.

Still further, in accordance with a preferred embodiment of the present invention, the front end processor is selectably operable with multiple vocoder types.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

There are many types of voice compression algorithms, the most common of which are those based on linear prediction coding (LPC). Applicants have realized that, since most voice recognition algorithms utilize linear prediction coding analysis in order to parametrize the voice signals, elements of the compressed voice signal can be provided to the voice recognizer to significantly reduce the amount of analysis which the voice recognizer must perform. Thus, the present invention is a vocoder based, voice recognizer to be implemented in the microcontroller or CPU of a cellular mobile telephone, as detailed hereinbelow with respect to FIGS. 5, 6 and 7.

Linear Prediction Analysis:

The following is a short description of the operation of LPC based vocoder 16. A discussion of speech coding in general, which includes a more complete description of linear prediction coding than that provided here, can be found in the article "Speech Coding: A Tutorial Review" by Andreas S. Spanias, *Proceedings of the IEEE*, Vol. 82, No. 10, Oct. 1994, pp. 1541–1582.

Vocoder 16 divides the voice signal into a series of frames, each of a length N, typically representing about 20 msec of the voice signal. On each frame, vocoder 16 performs linear prediction coding (LPC) analysis.

Linear prediction coding describes a voice signal y(n) as follows:

$$y(n)=a_1 y(n-1)+a_2 y(n-2)+ \ldots +a_p y(n-p)+\epsilon(n) \qquad \text{Equation 1}$$

where the $a_i$ are known as the LPC coefficients and $\epsilon(n)$ is known as the residual signal. Typically, each frame has p LPC coefficients $a_i$ and the residual signal $\epsilon(n)$ is of length N. The LPC coefficients and the residual signal form the parameters of the frame. The vocoder typically further parametrizes the residual signal $\epsilon(n)$ in terms of at least pitch and gain values. The vocoder can also generate any of the many types of LPC based parameters which are known in the art of LPC vocoders, such as cepstrum coefficients, MEL cepstrum coefficients, line spectral pairs (LSPs), reflection coefficients, log area ratio (LAR) coefficients, etc., all of which are easily calculated from the LPC coefficients.

Figure 4:
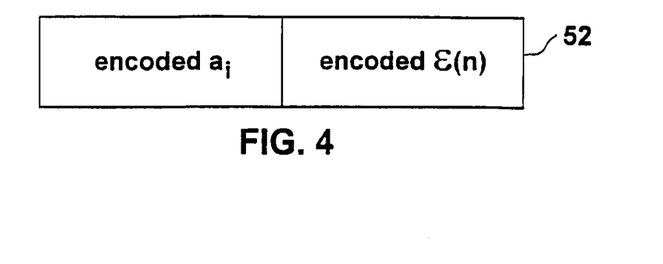
FIG. 4 is a schematic illustration of a compressed voice data structure.

The resultant values are then encoded, thereby producing a typical voice compression frame, such as frame 52 shown in FIG. 4 to which reference is now made. Voice compression frame 52 includes encoded and/or parametrized versions of the LPC coefficients $a_i$ and encoded versions of the residual signal $\epsilon(n)$.

A Vocoder Based, Voice Recognizer

Figure 5:
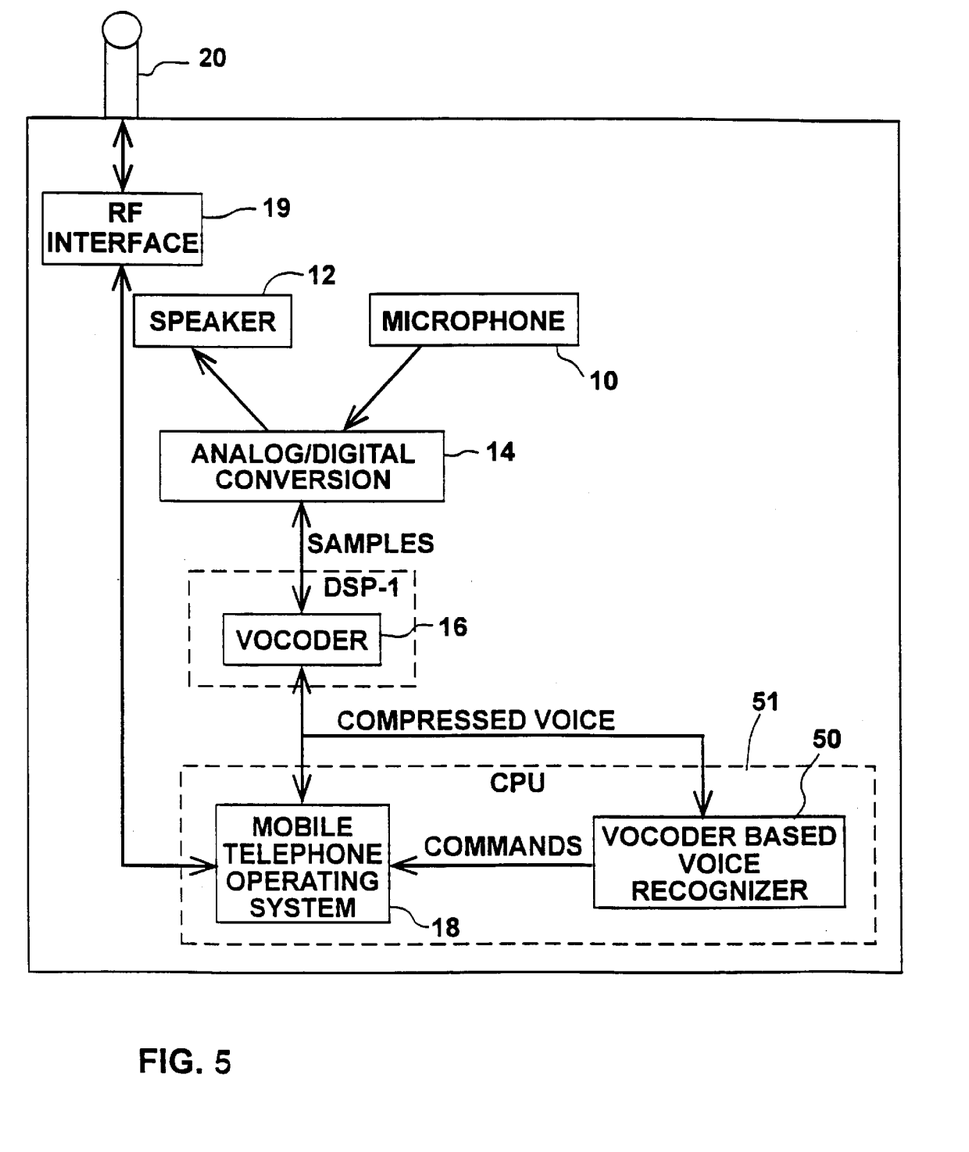
FIG. 5 is a block diagram illustration of a cellular telephone with a vocoder based voice recognizer, constructed and operative in accordance with a preferred embodiment of the present invention.
Figure 6:
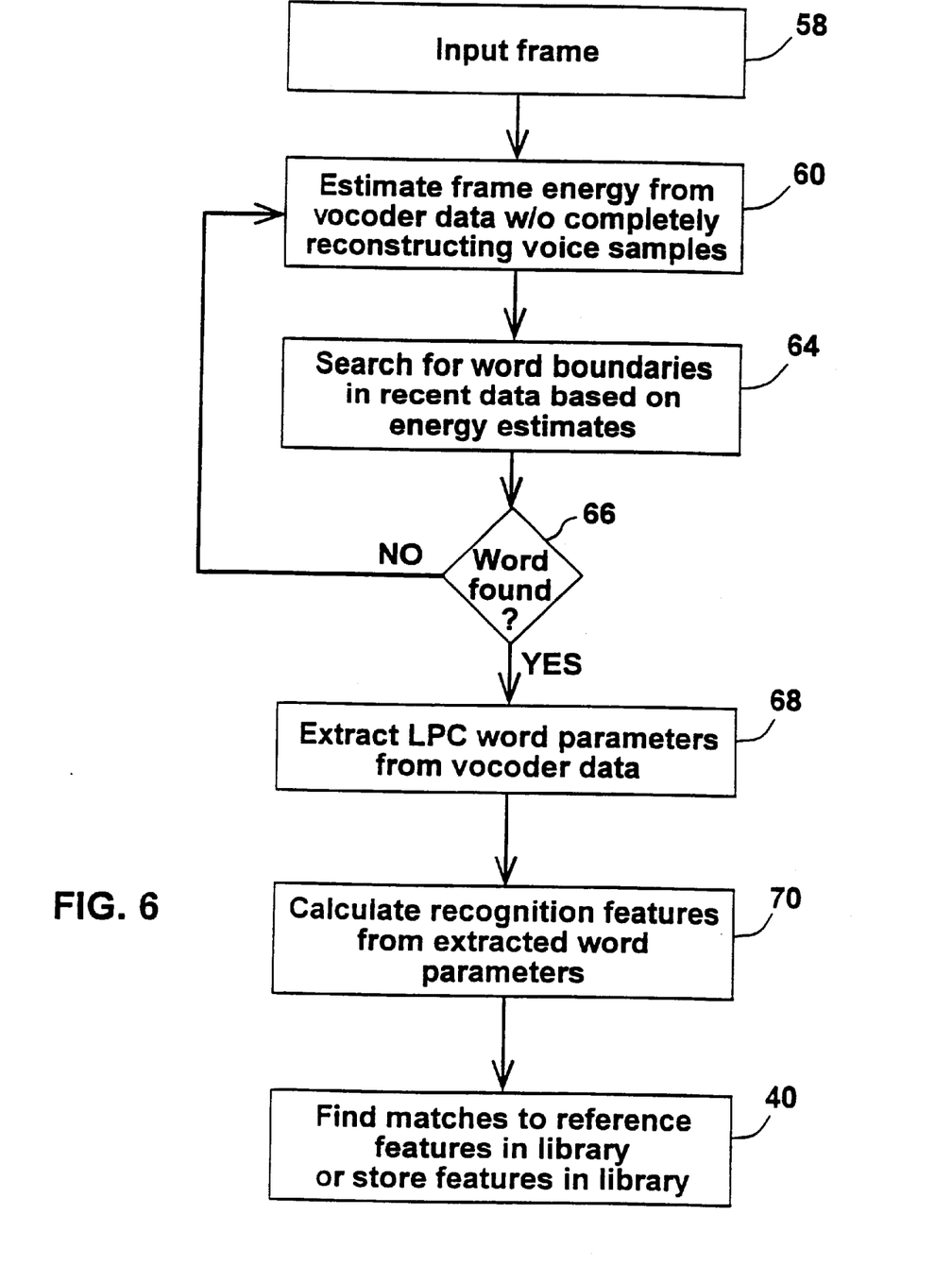
FIG. 6 is a flow chart illustration of a voice recognition method, in accordance with a preferred embodiment of the present invention.
Figure 7:
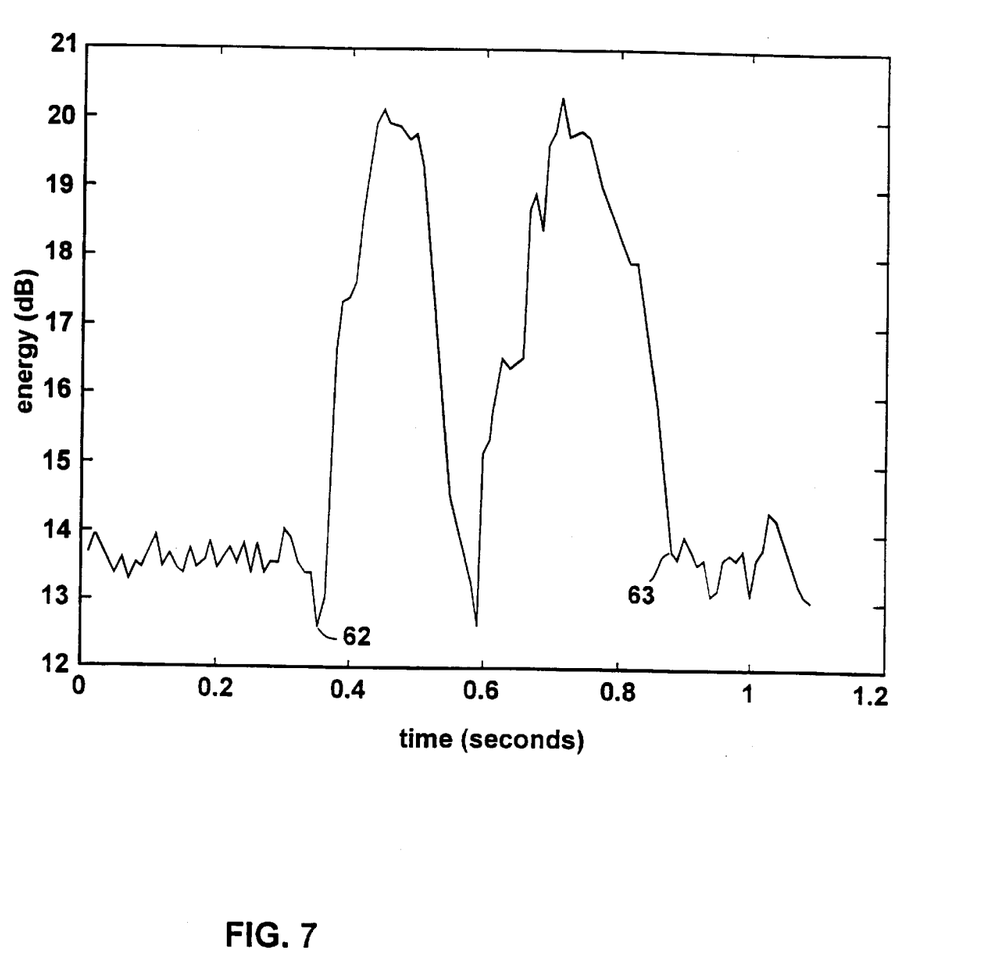
FIG. 7 is a graphical illustration of the energy of a spoken word as estimated from a residual signal.

Reference is now made to FIG. 5 which illustrates a vocoder based, voice recognizer 50 within a cellular telephone. Since the cellular telephone is similar to the prior art telephone shown in FIG. 1, similar reference numerals refer to similar elements. Reference is also made to FIGS. 6 and 7 which are useful in understanding the operation of vocoder based, voice recognizer 50.

The cellular telephone of FIG. 5 includes microphone 10, speaker 12, conversion unit 14, vocoder 16, operating system 18, RF interface unit 19 and antenna 20. In addition, the cellular telephone of FIG. 5 includes vocoder based, voice recognizer 50 which receives the LPC-based compressed voice signal, which vocoder 16 produces, as input.

In accordance with a preferred embodiment of the present invention, the vocoder based, voice recognizer 50 is implemented in the device, labeled CPU 51, which also implements the operating system 18. Device 51 can be a CPU, as labeled, or a microcontroller. Since voice recognizer 50 does not analyze the voice signal, voice recognizer 50 can be implemented on any type of microcontroller or CPU, including those which have only limited processing power and those which do not receive the voice signal.

FIG. 6 illustrates, in general form, the operations of vocoder based, voice recognizer 50 on a compressed frame such as the frame 52.

As in the prior art, the energy of the frame is determined once the frame, in step 58, has been received. However, in the present invention, the energy is estimated (step 60) from the vocoder data, rather than from the sampled data, and the energy estimation does not involve reconstructing the sampled data.

Applicants have recognized that the residual signal $\epsilon(n)$ can be utilized to estimate the energy since, as is known in the art, the residual signal describes the air pressure through the vocal tract while the LPC parameters describe the structure of the vocal tract and are, thus, generally independent of speech volume. As a result, the residual signal is highly correlated to how loudly or quietly a person talks.

In accordance with a preferred embodiment of the present invention, one method of estimating the energy is to determine the energy in the residual signal, per frame, or, if the frames are divided into subframes, per subframe. Mathematically, this can be written as:

$$\tilde{E}_i = \sum_{n=1}^{M} \epsilon(n)^2 \qquad \text{Equation 2}$$

where $\tilde{E}_i$ is the energy in the ith frame, the residual signal $\epsilon(n)$ is reconstructed from the vocoder data and the number M is the number of sample points in the frame or subframe.

FIG. 7 illustrates the estimated energy signal produced from the reconstructed residual signals of the voiced word "RICHARD". As can be seen, the estimated energy signal of FIG. 7 is not a replica of the energy signal of FIG. 3. However, the estimated energy signal is highly correlated with the prior art energy signal. The start and end points for the signal of FIG. 7, labeled 62 and 63, respectively, are also at about 0.37 sec and 0.85 sec, respectively.

Other methods of estimating the energy from the vocoder data are incorporated in the present invention, some of which are described hereinbelow.

Returning to FIG. 6, the vocoder based, voice recognizer 50 searches (step 64) for word boundaries in the estimated energy signal. If desired, voice recognizer 50 can refine the location of the word boundaries by using any of the characteristics of the LPC parameters (such as their mean and/or variance) which change sharply at a word boundary.

If a word is found, as checked by step 66, recognizer 50 extracts (step 68) the LPC word parameters from the vocoder data. Step 68 typically involves decoding the encoded LPC parameters provided in voice compression frame 52 and converting them to the LPC coefficients.

Recognizer 50 then calculates (step 70) its recognition features from the extracted LPC coefficients. These recognition features can be any of the many LPC based parameters, such as cepstrum coefficients, MEL cepstrum coefficients, line spectral pairs (LSPs), reflection coefficients, log area ratio (LAR). coefficients, etc., all of which are easily calculated from the LPC coefficients. Thus, if the vocoder uses one type of LPC parameter and the recognizer 50 use another type of LPC parameter, recognizer 50 can convert from one to the other either directly or through the LPC coefficients.

Finally, recognizer 50 utilizes the recognition features produced in step 70 to either recognize the input signal as one of the reference words in its reference library or to train a new reference word into its library. Since the recognition features produced by recognizer 50 can be the same as those used in the prior art, this step is equivalent to the recognition/training step 40 of the prior art and thus is so labeled. The book, *Fundamentals of Speech Recognition*, by Lawrence Rabiner and Biing Hwang Juang, Prentice-Hall, 1993, describes suitable recognizers 50 and is incorporated herein by reference.

It will be appreciated that steps 60–70 convert from the vocoder data to the recognition features needed for the recognition/training step. There are many LPC based vocoders, each of which performs somewhat different operations on the voice signal. Steps 60–70 can be tailored to each type of vocoder, in order to produce the same recognition features, regardless of vocoder type. Thus, steps 60–70 form a processing "front end" to the recognition/training step 40.

The present invention incorporates a vocoder based, voice recognizer which has a plurality of front ends and a single recognition / training unit. This is particularly useful for those mobile telephones which are sold to operate with multiple types of digital cellular telephone systems, each of which uses a different type of vocoder. With many front ends, the voice recognizer of the present invention can operate with many vocoder types.

Energy Estimation Methods for use in Determining the Word Boundaries

Figure 8:
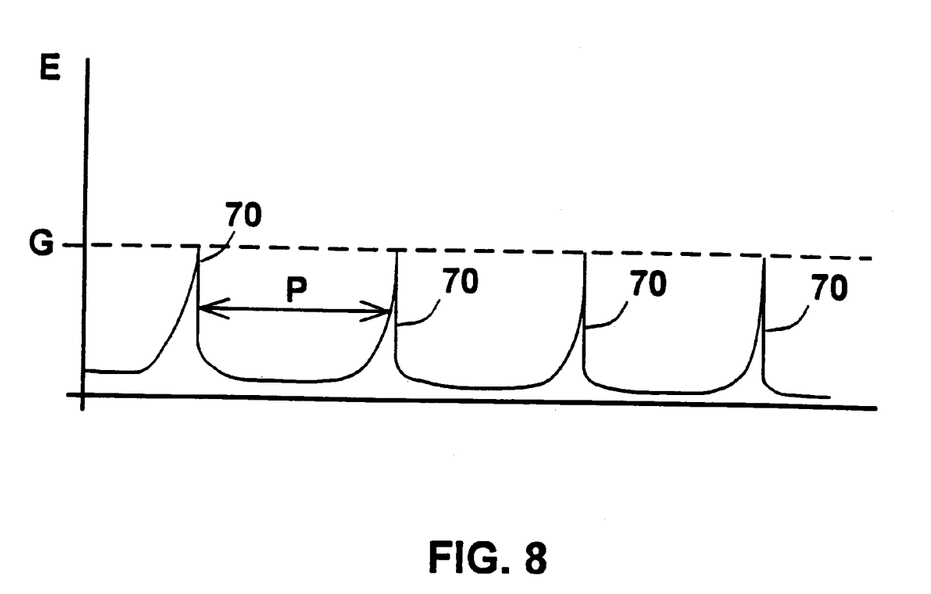
FIG. 8 is a graphical illustration of a residual signal, useful in understanding the operation of the present invention.

Some simple vocoders, such as the vocoder known as the LPC10 described in the US Department of Defense standard 1015 V.53, describe the residual signal. $\epsilon(n)$ with just the pitch and gain values. FIG. 8, to which reference is now made, illustrates an exemplary residual signal, of a voiced signal, which has a series of repeating peaks 70, all of approximately the same magnitude. The distance between peaks 70 is defined as the pitch P and the magnitude of the peaks 70 is defined as the gain G. A non-voiced signal has a gain value but no pitch value.

Thus, the energy of the residual signal of the frame or subframe can be estimated by the gain value G. In this example, the energy of the frame or subframe is not estimated by reconstructing the residual signal ϵ(n) but by extracting the gain value G, a parameter of the residual signal ϵ(n), from the compressed voice data.

Other vocoders, such as the vocoders used in Global System for Mobile Communications (GSM), Time Division Multiple Access (TDMA) and Code Division Multiple Access (CDMA) digital cellular communication systems, correlate the residual signal of the current frame or subframe with a concatenated version of the residual signals of previous frames. The point at which the residual signal of the current frame most closely matches previous residual signals, when multiplied by a pitch gain PG, is known as the LAG value. The vocoders then determine a "remnant signal" which is the difference between the previous residual signal multiplied by the pitch gain PG and the current residual signal. The current residual signal is then characterized by the pitch gain PG, the LAG value and the remnant signal.

For the later type of vocoder, the energy of the current frame or subframe, i, can be estimated from the remnant signal and from the non-remnant portion of the residual signal, by:

$$\tilde{E}_i = \sqrt[m]{E_{LAG}^m + E_{rem}^m} \quad (m = 1 \text{ or } 2) \qquad \text{Equation 3}$$

$$E_{LAG} = PG \cdot \frac{1}{FL}$$

$$\left\{ (LAG \bmod 40) E_{i-\lceil \frac{LAG}{FL} \rceil} + (FL - LAG \bmod 40) E_{i-\lfloor \frac{LAG}{FL} \rfloor} \right\}$$

where $E_{rem}$ is the energy estimate of the remnant signal and $E_{LAG}$ is the non-remnant energy of the residual, as determined from the energy of the frame or subframe which is LAG/FL frames or subframes behind the current frame or subframe and the pitch gain. The former can be produced by reconstructing the remnant signal, a relatively simple operation, or by any other method. The symbols ⌈⌉ and ⌊⌋ indicate the "ceiling" and "floor" operations, respectively and the mth root operation need not be performed.

Energy Estimation for GSM Vocoders

Figure 9:
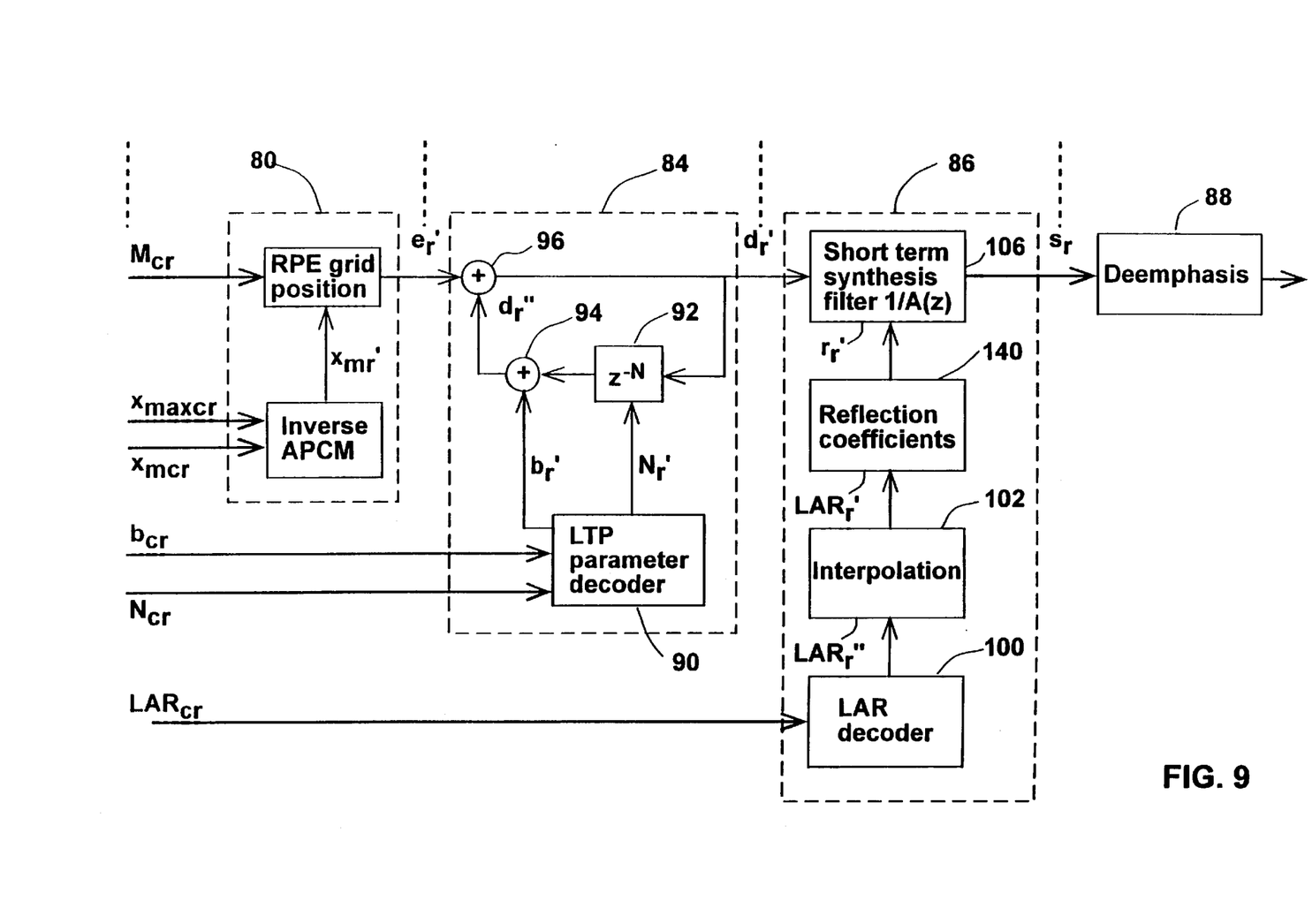
FIG. 9 is a block diagram illustration of a GSM decoder.

Reference is now briefly made to FIG. 9 which illustrates the decoder portion of a vocoder which forms part of the GSM standard. FIG. 9 is similar to FIG. 3.4 of the March 1992 version of the I-ETS 300 036 specification from the European Telecommunications Standards Institute, found on page 34 thereof. The details of the decoder are provided in the above-identified specification, which is incorporated herein by reference. For clarity, only the aspects of the decoder necessary for understanding the energy and feature calculations of the present invention are provided hereinbelow.

FIG. 9 indicates input data with thick lines and internal signals with thin lines. The input data includes the values $M_{cr}$, $X_{maxcr}$, $X_{mcr}$, $b_{cr}$, $N_{cr}$ and $LAR_{cr}$, all of which are defined in the I-ETS specification.

FIG. 9 shows that the decoder includes an RPE decoder 80, a long term predictor 84, a short term synthesis filter 86, and a de-emphasizer 88. The RPE decoder 80 receives the $M_{cr}$, $X_{maxcr}$ and $X_{mcr}$ signals and generates a remnant signal $e_r'$. The long term predictor 84 uses the $b_{cr}$ and $N_{cr}$ signals to generate a residual signal $d_r'$ from the remnant signal $e_r'$. The short term synthesis filter 86 generates the voice signal from the residual signal $d_r'$ and the short term LPC parameters, transmitted in the form of the $LAR_{cr}$ data.

One energy calculation, similar to that described hereinabove, takes the first or second norm of the residual signal $d_r'$, as follows:

$$\tilde{E}_i = \sum_{n=0}^{39} |d_r'[n]|^m \quad (m = 1 \text{ or } 2) \qquad \text{Equation 4}$$

Another energy calculation uses the remnant signal $e_r'$ and the internal data values $b_r'$ and $N_r'$ of the long term predictor 84. Specifically, predictor 84 includes a parameter decoder 90, a delay unit 92, a multiplier 94 and a summer 96. Decoder 90 converts the input values $b_{cr}$ and $N_{cr}$ to the internal data values $b_r'$ and $N_r'$, where $b_r'$ is a multiplier, similar to the pitch gain PG discussed hereinabove, and $N_r'$; is a delay amount, similar to the value LAG discussed hereinabove. Long term predictor 84 adds the signal $d_r''$ to the remnant signal $e_r'$, where the signal $d_r''$ is the previous residual signal $d_r'$ (l-$N_r'$), as delayed by delay unit 92, multiplied by an amount $b_r'$ via multiplier 94.

The energy can be estimated using Equation 3, where $N_r'$ and $b_r'$ replace the LAG and PG values and FL is set to 40. Furthermore, the energy estimate of the remnant, $E_{rem}$, is calculated by:

$$E_{rem} = \sum_{n=0}^{39} |e_r'[k]|^m \qquad \text{Equation 5}$$

Figure 10:
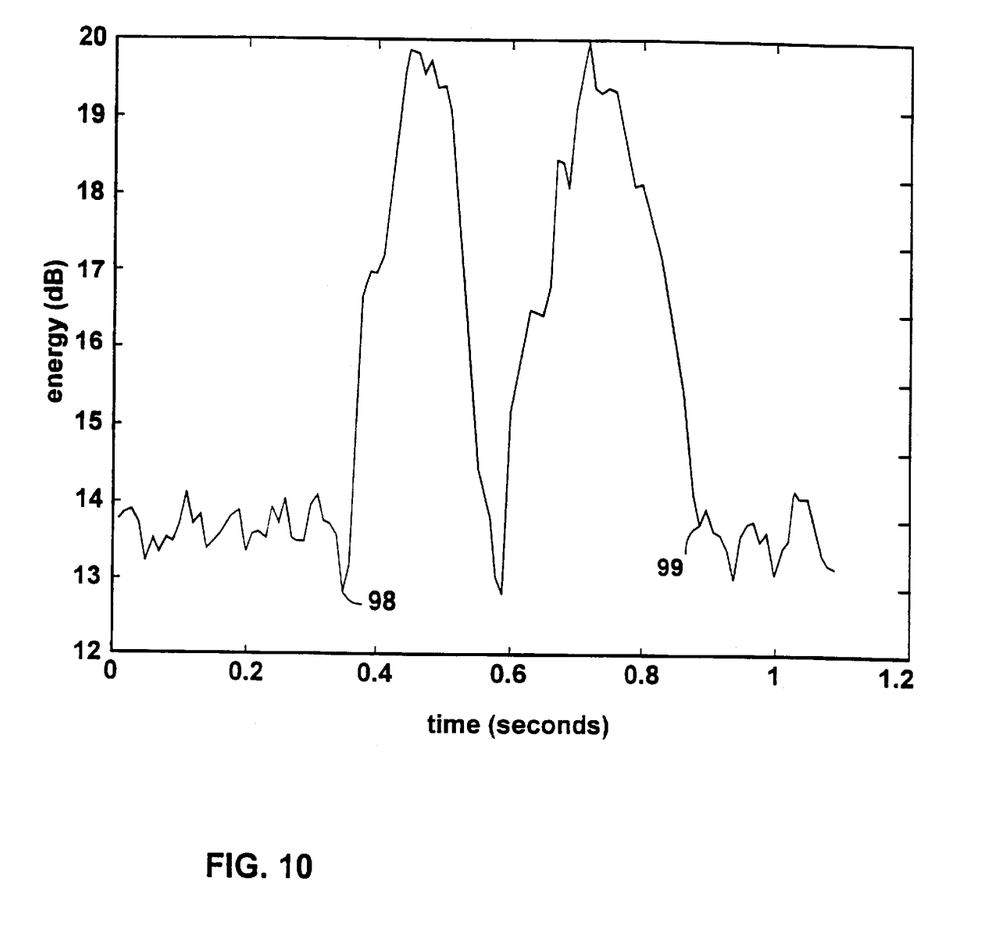
FIG. 10 is a graphical illustration of the energy of a spoken word as estimated from an estimated residual signal.

FIG. 10, to which reference is now briefly made, shows the estimated energy using the above calculation. The start and stop word boundaries, labeled 98 and 99, respectively occur at the same locations as in the prior art.

Another method of estimating the energy from the extracted parameters also uses $N_r'$ and $b_r'$ as above, with FL set to 40, and estimates the energy estimate of the remnant, $E_{rem}$, as:

$$E_{rem} = |X_{maxcr}| \qquad \text{Equation 6}$$

Returning to FIG. 9, the LPC word parameters are extracted from the transmitted data within the short term synthesis filter 86 which includes an LAR decoder 100, an interpolator 102, a reflection coefficients determining unit 140 and a filter 106. Together, units 100, 102 and 140 convert the received $LAR_{cr}$ data to the reflection coefficients $r_r'$, where the latter are easily transformed into LPC coefficients.

As mentioned hereinabove with respect to FIG. 6, once the LPC coefficients are extracted, they are transformed (step 70) into the recognition features which the recognizer/training step requires.

It will be appreciated by those skilled in the art that, while a full explanation has been provided for the vocoder of the GSM digital cellular communication system, the present invention is applicable to all types of digital cellular communication systems and to all types of LPC-based vocoders. For each type of vocoder, the type of information stored in the compressed voice data must be analyzed to determine how to utilize it for the energy and feature calculations. The compressed voice data is described in detail in the standard defining each vocoder.

The following table lists some currently available cellular communication systems, the vocoders they work with and the standards defining the vocoders and/or the systems.

| Digital Cellular Communication System | LPC-based Vocoder | Standard |
| --- | --- | --- |
| GSM | RPE-LTP full rate | I-ETS 300 036 6.1 |
| | RPE-LTP half rate | I-ETS 300 581-2 ver. 4 |
| CDMA | QCELP 8 Kbps, 13 Kbps | IS 96 A |
| | EVRC | IS 127 |
| | LD CELP | ITU G.728 |
| TDMA | VSELP | IS 54 B |
| PHS, PCS | CS ACELP | ITU G.729 |
| PCS-TDMA | Enhanced Full Rate Vocoder | IS 641 |
| PDC (in Japan) | VSELP | RCR STD 27 |

It will be appreciated by persons skilled in the art that the present invention is not limited by what has been particularly shown and described herein above. Rather the scope of the invention is defined by the claims that follow:

What is claimed is:

1. A digital cellular telephone comprising:
   a mobile telephone operating system;
   a vocoder which compresses a voice signal using at least linear prediction coding (LPC) thereby to produce compressed speech data; and
   speech recognizer comprising:
      a front end processor, operating on said compressed speech data without completely decompressing said compressed speech data, which generates at least one recognition feature from said compressed speech data; and
      a recognition unit which utilizes said at least one recognition feature to recognize spoken words in said compressed speech data as one of a set of reference words.

2. A digital cellular telephone according to claim 1 wherein said front end processor includes:
   an energy estimator for generating at least one energy estimate for at least a portion of said compressed speech data without completely decompressing said compressed speech data;
   an LPC parameter extractor which extracts the LPC based parameters of said compressed speech data; and
   a recognition feature generator which generates said recognition features from said LPC based parameters.

3. A digital cellular telephone according to claim 2 wherein said energy estimator comprises means for using residual information forming part of said compressed speech data to estimate the energy of a voice signal.

4. A telephone according to claim 2 wherein said LPC based parameters are one of the following type of parameters: cepstrum coefficients, MEL cepstrum coefficients, line spectral pairs (LSPs), reflection coefficients, log area ratio (LAR) coefficients and LPC coefficients.

5. A digital cellular telephone according to claim 1 wherein said front end processor includes:
   an LPC parameter extractor which extracts the LPC based parameters of said compressed speech data; and
   a recognition feature generator which generates said recognition features from said LPC based parameters.

6. A telephone according to claim 5 wherein said LPC based parameters are one of the following type of parameters: cepstrum coefficients, MEL cepstrum coefficients, line spectral pairs (LSPs), reflection coefficients, log area ratio (LAR) coefficients and LPC coefficients.

7. A telephone according to claim 1 wherein said compressed speech data is of the type produced by any of the following vocoders: Regular Pulse Excitation-Long Term Prediction (RPE-LTP) full and half rate, Qualcomm Code Excited Linear Prediction (QCELP) 8 and 13 Kbps, Enhanced Variable Rate Codec (EVRC), Low Delay Code Excited Linear Prediction (LD CELP), Vector Sum Excited Linear Prediction (VSELP), Conjugate Structure Algebraic Code Excited Linear Prediction (CS ACELP), Enhanced Full Rate Vocoder and 10 Linear Prediction Coefficients (LPC10).

8. A speech recognizer comprising:
   a front end processor which processes compressed speech data which has been compressed by a vocoder using linear prediction coding (LPC) techniques, without completely decompressing said compressed speech data, which generates at least one recognition feature from said compressed speech data; and
   a recognition unit which utilizes said at least one recognition feature to recognize spoken words in sad compressed speech data as one of a set of reference words.

9. A speech recognizer according to claim 8 wherein said front end processor includes:
   an energy estimator for generating at least one energy estimate for at least a portion of said compressed speech data without completely decompressing said compressed speech data;
   an LPC parameter extractor which extracts the LPC based parameters of said compressed speech data; and
   a recognition feature generator which generates said recognition features from said LPC based parameters.

10. A speech recognizer according to claim 9 wherein said energy estimator comprises means for using residual information forming part of said compressed speech data to estimate the energy of a voice signal.

11. A speech recognizer according to claim 9 wherein said LPC based parameters are one of the following type of parameters: cepstrum coefficients, MEL cepstrum coefficients, line spectral pairs (LSPs), reflection coefficients, log area ratio (LAR) coefficients and LPC coefficients.

12. A speech recognizer according to claim 8 wherein said front end processor includes:
   an LPC parameter extractor which extracts the LPC based parameters of said compressed speech data; and
   a recognition feature generator which generates said recognition features from said LPC based parameters.

13. A speech recognizer according to claim 12 wherein said LPC based parameters are one of the following type of parameters: cepstrum coefficients, MEL cepstrun coefficients, line spectral pairs (LSPs), reflection coefficients, log area ratio (LAR) coefficients and LPC coefficients.

14. A speech recognizer according to claim 8 wherein said compressed speech data is of the type produced by any of the following vocoders: Regular Pulse Excitation-Long Term Prediction (RPE-LTP) full and half rate, Qualcomm Code Excited Linear Prediction (QCELP) 8 and 13 Kbps, Enhanced Variable Rate Codec (EVRC), Low Delay Code Excited Linear Prediction (LD CELP), Vector Sum Excited Linear Prediction (VSELP), Conjugate Structure Algebraic Code Excited Linear Prediction (CS ACELP), Enhanced Full Rate Vocoder and 10 Linear Prediction Coefficients (LPC10).

15. A digital cellular telephone comprising:
   a mobile telephone operating system;
   a plurality of vocoders each of which compresses a voice signal using at least linear prediction coding (LPC)

thereby to produce compressed speech data, each vocoder operable with one of a corresponding plurality of vocoder types; and a speech recognizer comprising:

a corresponding plurality of front end processors, at least one for each of said vocoder types, each said processor operable on said compressed speech data without completely decompressing said compressed speech data, which generate at least one recognition feature from said compressed speech data; and a recognition unit which utilizes said at least one recognition feature to recognize spoken words in said compressed speech data as one of a set of reference words.

16. A digital cellular telephone according to claim 15 wherein each of said front end processors includes:

an energy estimator for generating at least one energy estimate for at least a portion of said compressed speech data without completely decompressing said compressed speech data;

an LPC parameter extractor which extracts the LPC based parameters of said compressed speech data; and a recognition feature generator which generates said recognition features from said LPC based parameters.

17. A digital cellular telephone according to claim 16 wherein said energy estimator comprises means for using residual information forming part of said compressed speech data to estimate the energy of a voice signal.

18. A telephone according to claim 16 wherein said LPC based parameters are one of the following type of parameters: cepstrum coefficients, MEL cepstrum coefficients, line spectral pairs (LSPs), reflection coefficients, log area ratio (LAR) coefficients and LPC coefficients.

19. A digital cellular telephone according to claim 15 wherein said front end processor includes:

an LPC parameter extractor which extracts the LPC based parameters of said compressed speech data; and a recognition feature generator which generates said recognition features from said LPC based parameters.

20. A telephone according to claim 19 wherein said LPC based parameters are one of the following type of parameters: cepstrum coefficients, MEL cepstrum coefficients, line spectral pairs (LSPs), reflection coefficients, log area ratio (LAR) coefficients and LPC coefficients.

21. A telephone according to claim 15 wherein each of said front end processors further comprises at least one energy estimator which uses residual information forming part of said compressed speech data to estimate the energy of a voice signal.

22. A telephone according to claim 15 wherein said compressed speech data is of the type produced by any of the following vocoders: Regular Pulse Excitation-Long Term Prediction (RPE-LTP) full and half rate, Qualcomm Code Excited Linear Prediction (QCELP) 8 and 13 Kbps, Enhanced Variable Rate Codec (EVRC), Low Delay Code Excited Linear Prediction (LD CELP), Vector Sum Excited Linear Prediction (VSELP), Conjugate Structure Algebraic Code Excited Linear Prediction (CS ACELP), Enhanced Full Rate Vocoder and 10 Linear Prediction Coefficients (LPC10).

23. A front end processor for processing compressed speech data for a speech recognizer, the front end processor comprising:

means for receiving compressed speech data that has been compressed using linear prediction coding (LPC) techniques;

an extractor for extracting at least one set of LPC based parameters from said compressed speech data without completely decompressing said compressed speech data; and a feature generator for generating at least one recognition feature from said at least one set of LPC based parameters.

24. A front end processor according to claim 23 and further comprising:

an energy estimator for generating at least one energy estimate for at least a portion of said compressed speech data without completely decompressing said compressed speech data; and a boundary locator for searching for at least two word boundaries in said compressed speech data in accordance with said at least one energy estimate, wherein said at least one set of LPC based parameters is from an area between said at least two boundaries.

25. A front end processor according to claim 24 wherein said energy estimator includes means for generating said at least one energy estimate by estimating the energy from residual data found in said compressed speech data.

26. A front end processor according to claim 24 wherein said energy estimator includes means for generating said at least one energy estimate by reconstructing residual data from said compressed speech data and generating the norm of said residual data.

27. A front end processor according to claim 24 wherein said energy estimator includes means for generating said at least one energy estimate by extracting a pitch-gain value from said compressed speech data and using said extracted pitch-gain value as said energy estimate.

28. A front end processor according to claim 24 wherein said energy estimator includes means for generating said at least one energy estimate wherein said means comprises:

an extractor for extracting pitch-gain values, lag values and remnant data from said compressed speech data;

means for reconstructing a remnant signal from said remnant data;

a first estimator for generating an energy estimate of said remnant signal;

a second estimator for generating an energy estimate of a non-remnant portion of said residual by using said pitch-gain value and a previous energy estimate defined by said lag value; and means for combining said remnant and non-remnant energy estimates.

29. A front end processor according to claim 23 wherein said LPC based parameters are one of the following type of parameters: cepstrum coefficients, MEL cepstrum coefficients, line spectral pairs (LSPs), reflection coefficients, log area ratio (LAR) coefficients and LPC coefficients.

30. A front end processor according to claim 23 wherein said compressed speech data is of the type produced by any of the following vocoders: Regular Pulse Excitation-Long Term Prediction (RPE-LTP) full and half rate, Qualcomm Code Excited Linear Prediction (QCELP) 8 and 13 Kbps, Enhanced Variable Rate Codec (EVRC), Low Delay Code Excited Linear Prediction (LD CELP), Vector Sum Excited Linear Prediction (VSELP), Conjugate Structure Algebraic Code Excited Linear Prediction (CS ACELP), Enhanced Full Rate Vocoder and 10 Linear Prediction Coefficients (LPC10).

31. A front end processor for processing compressed speech data for a speech recognizer, the front end processor comprising:

means for receiving compressed speech data that has been compressed using linear prediction coding (LPC) techniques; and means for generating at least one recognition feature by extracting at lease one set of LPC based parameters from said compressed speech data without completely decompressing said compressed speech data.

32. A front end processor according to claim 31 and further comprising:

an energy estimator for generating at least one energy estimate for at least a portion of said compressed speech data without completely decompressing said compressed speech data; and a boundary locator for searching for at least two word boundaries in said compressed speech data in accordance with said at least one energy estimate, wherein said at least one set of LPC based parameters is from an area between said at least two boundaries.

33. A front end processor according to claim 32 wherein said energy estimator includes means for generating said at least one energy estimate by estimating the energy from residual data found in said compressed speech data.

34. A front end processor according to claim 32 wherein said energy estimator includes means for generating said at least one energy estimate by reconstructing residual data from said compressed speech data and generating the norm of said residual data.

35. A front end processor according to claim 32 wherein said energy estimator includes means for generating said at least one energy estimate by extracting a pitch-gain value from said compressed speech data and using said extracted pitch-gain value as said energy estimate.

36. A front end processor according to claim 32 wherein said energy estimator includes means for generating said at least one energy estimate wherein said means comprises:

an extractor for extracting pitch-gain values, lag values and remnant data from said compressed speech data;

means for reconstructing a remnant signal from said remnant data;

a first estimator for generating an energy estimate of said remnant signal;

a second estimator for generating an energy estimate of a non-remnant portion of said residual by using said pitch-gain value and a previous energy estimate defined by said lag value; and means for combining said remnant and non-remnant energy estimates.

* * * * *

UNITED STATES PATENT AND TRADEMARK OFFICE
CERTIFICATE OF CORRECTION

PATENT NO. : 6,377,923 B1
DATED : April 23, 2002
INVENTOR(S) : Yehuda Hershkovits et al.

It is certified that error appears in the above-identified patent and that said Letters Patent is hereby corrected as shown below:

<u>Title page, item [54] and Column 1, lines 1-3,</u>
Please delete "SPEECH RECOGNITION METHOD AND SYSTEM USING COMPRESSION SPEECH DATA" and insert -- SPEECH RECOGNITION METHOD AND SYSTEM USING COMPRESSED SPEECH DATA --.

<u>Title page,</u>
Item [75], Inventors, please delete "Yehudah Hershkovits, Mobile Post Emek Sorek; Gavriel Ilan, Tel Aviv, both of (IL)" and insert -- Yehudah Hershkovits, Moshav Kfar Hanagid; Gavriel Ilan, Tel Aviv, both of (IL) --.

Signed and Sealed this

Eighteenth Day of November, 2003

JAMES E. ROGAN
*Director of the United States Patent and Trademark Office*